US012649617B2

(12) United States Patent
Goodrum

(10) Patent No.: US 12,649,617 B2
(45) Date of Patent: Jun. 9, 2026

(54) PORTABLE COMPUTER MOUSE STORAGE DEVICE WITH AN INTEGRATED MOUSE PAD

(71) Applicant: DAJ RISING, INC., Kent, WA (US)

(72) Inventor: Aundra Goodrum, Kent, WA (US)

(73) Assignee: DAJ RISING, INC., Kent, WA (US)

( * ) Notice: Subject to any disclaimer, the term of this patent is extended or adjusted under 35 U.S.C. 154(b) by 50 days.

(21) Appl. No.: 18/887,863

(22) Filed: Sep. 17, 2024

(65) Prior Publication Data

US 2025/0250094 A1      Aug. 7, 2025

Related U.S. Application Data

(60) Provisional application No. 63/549,774, filed on Feb. 5, 2024.

(51) Int. Cl.
| | |
|---|---|
| *B65D 81/36* | (2006.01) |
| *B65D 37/00* | (2006.01) |
| *B65D 81/02* | (2006.01) |
| *G06F 3/039* | (2013.01) |

(52) U.S. Cl.
CPC ............. *B65D 81/36* (2013.01); *B65D 37/00* (2013.01); *B65D 81/022* (2013.01); *G06F 3/0395* (2013.01)

(58) Field of Classification Search
CPC ...... B65D 81/36; B65D 81/022; B65D 37/00; G06F 3/0395

USPC ...................................................... 248/346.01
See application file for complete search history.

(56) References Cited

U.S. PATENT DOCUMENTS

| | | | | | |
|---|---|---|---|---|---|
| 6,871,739 | B2 * | 3/2005 | Lopez | ..................... | A45C 13/02 |
| | | | | | 190/18 R |
| 7,843,432 | B2 * | 11/2010 | Sween | ..................... | A45F 5/021 |
| | | | | | 206/320 |
| 2005/0067319 | A1 * | 3/2005 | Wei | ........................ | G06F 1/1613 |
| | | | | | 206/576 |
| 2010/0089778 | A1 * | 4/2010 | Park | ..................... | A45C 7/0095 |
| | | | | | 206/320 |
| 2017/0112249 | A1 * | 4/2017 | Peterson | ................ | A45C 11/00 |

* cited by examiner

*Primary Examiner* — Anita M King
(74) *Attorney, Agent, or Firm* — Procopio, Cory, Hargreaves & Savitch LLP

(57) ABSTRACT

A portable computer mouse storage device comprises a main body portion formed of flexible material configured to accommodate a portable computer mouse, the main body portion having an external flat surface area configured to accommodate movement of the portable computer mouse, an internal surface area in the opposite side of the external flat surface area, and a storage pocket in the opposite side of the external flat surface area, wherein the internal surface area runs beneath the storage pocket; a foldable cover attached to the main body, configured to be folded towards the internal surface area of the main body; wherein the foldable cover includes a cushioning layer positioned within the foldable cover; and a closure mechanism configured to secure the foldable cover to the storage pocket.

18 Claims, 7 Drawing Sheets

PORTABLE COMPUTER MOUSE STORAGE DEVICE WITH AN INTEGRATED MOUSE PAD

TECHNICAL FIELD

The embodiments described herein are generally directed to a portable computer mouse storage device, and, more particularly, to a portable computer mouse storage device with integrated mouse pad.

BACKGROUND

In the fast-paced environment of professionals, ergonomic risks are prevalent, particularly when it comes to the use of computer accessories like mouse pads. Frequently, professionals have to work without a mouse pad or a proper desk, which can lead to improper wrist positioning and increased strain due to improvised workspaces. Further, professionals often adapt to different workspaces without adequate ergonomic support and aggravate these problems, creating a cycle of discomfort and reduced efficiency. The absence of a proper mouse pad or ergonomic tools can result in irregular postures that can result in injuries, leading to discomfort and increase the risk of long-term issues such as carpal tunnel syndrome.

On the other hand, when a mouse pad is available, it is often bulky and inconvenient for those who travel frequently for business. Due to the frequent traveling, business professionals often prioritize lightweight and compact items to ease the burden of carrying heavy luggage. However, not carrying bulky accessories means that many opt to use the bare surfaces available to them, perpetuating the ergonomic risks. The challenge of balancing ergonomics and comfort with the need for light and portable equipment underscores the importance of developing compact, travel-friendly ergonomic solutions for the modern professional. Accordingly, a portable computer mouse storage device with an integrated mouse pad would offer a variety of benefits such as travel-friendly ergonomic solutions for the modern professional. The present disclosure is directed toward overcoming one or more of the problems discovered by the inventor.

SUMMARY

In an embodiment, a portable computer mouse storage device, comprises: a main body portion formed of flexible material configured to accommodate a portable computer mouse, the main body portion having an external flat surface area configured to accommodate movement of the portable computer mouse, an internal surface area in the opposite side of the external flat surface area, and a storage pocket in the opposite side of the external flat surface area, wherein the internal surface area runs beneath the storage pocket; a foldable cover attached to the main body, configured to be folded towards the internal surface area of the main body; wherein the foldable cover includes a cushioning layer positioned within the foldable cover; and a closure mechanism configured to secure the foldable cover to the storage pocket.

In an embodiment, a computer mouse pad with a storage system, the system comprises: a main body portion formed of flexible material configured to accommodate a portable computer mouse, the main body portion having an external flat surface area configured to accommodate movement of the portable computer mouse, an internal surface area in the opposite side of the external flat surface area, and a storage pocket in the opposite side of the external flat surface area, wherein the internal surface area runs beneath the storage pocket; a foldable cover attached to the main body, configured to be folded towards the internal surface area of the main body; wherein the foldable cover includes a cushioning layer positioned within the foldable cover; and a closure mechanism configured to secure the foldable cover to the internal surface area.

In an embodiment, a method for storing a portable computer mouse, comprises: forming a main body portion using flexible material to accommodate a portable computer mouse, wherein the main body portion includes an external flat surface area configured to accommodate movement of the portable computer mouse, an internal surface area in the opposite side of the external flat surface area, and a storage pocket in the opposite side of the external flat surface area, wherein the internal surface area runs beneath the storage pocket; attaching a foldable cover to the main body portion, the foldable cover being foldable towards the storage pocket of the main body; wherein the foldable cover includes a cushioning layer positioned within the foldable cover; and wherein the foldable cover can be unfolded to become a computer mouse pad.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
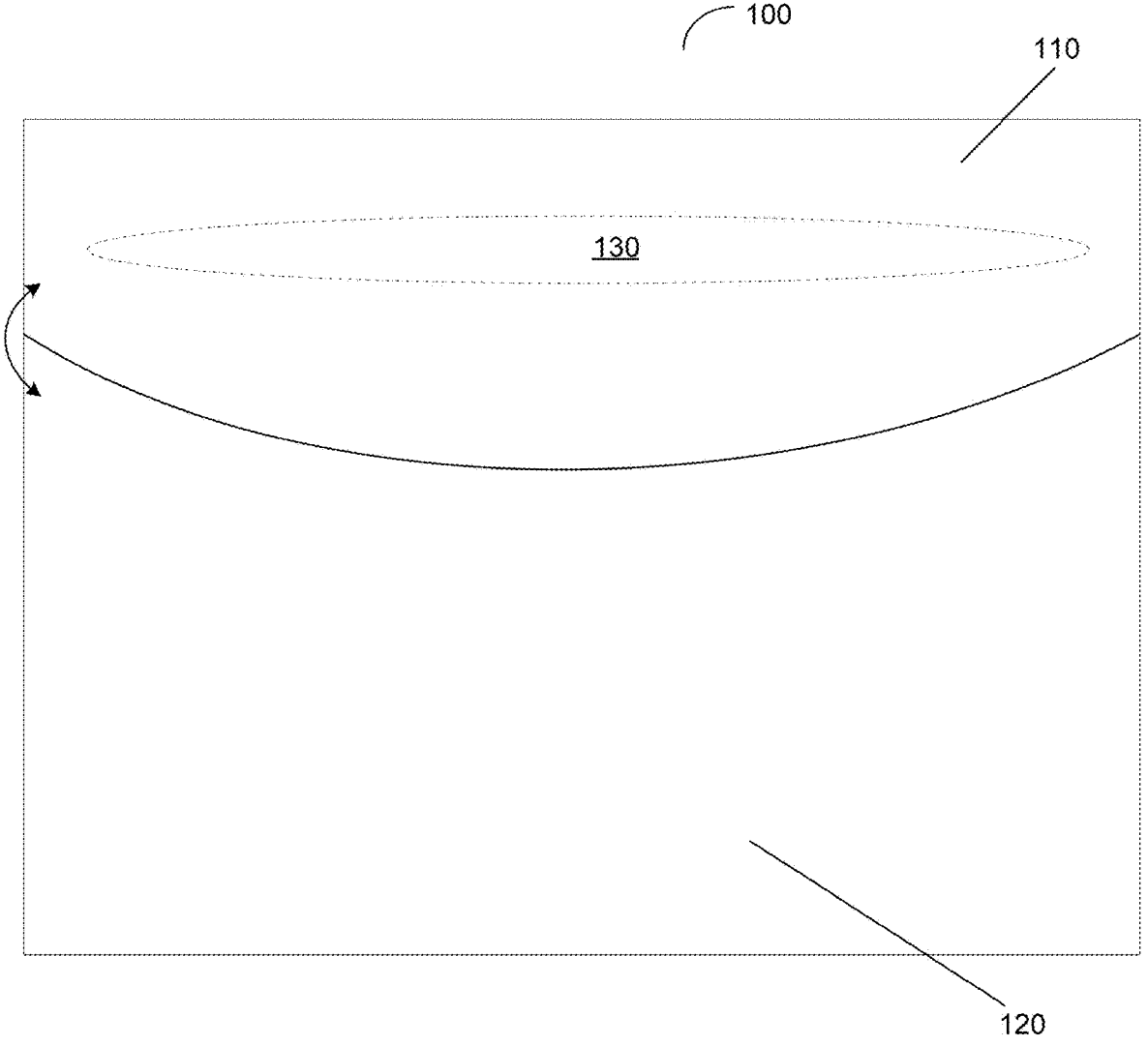
FIG. 1 illustrates a portable computer mouse storage device in closed position, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description. In addition, it should be understood that the various components illustrated herein are not necessarily drawn to scale. In other words, the features disclosed in various embodiments may be implemented using different relative dimensions within and between components than those illustrated in the drawings.

FIG. 1 illustrates a portable computer mouse storage device 100 in closed position, according to an embodiment.

Portable computer mouse storage device 100 includes a main body 200, a foldable cover 110 with a wrist support 130, and which can be opened and closed, and a closure mechanism 220. Further, main body 200 comprises a storage pocket 120, an internal surface area 210, and an external flat surface area 230. Although only one or two of each component is illustrated, it should be understood portable computer mouse storage device 100 may comprise any number of each component, including a plurality of one or more components. Further, some components are described in FIGS. 2A and 2B.

Portable computer mouse storage device 100 can be covered by a sleeve as a protective and decorative covering. The fabric can be made from various materials, each offering unique characteristics and functionalities. For example, fabric can be made from cloth or fabric materials such as linen, cotton, or silk. These materials not only provide an elegant tactile experience but also offer enhanced longevity, making them ideal for continuous use while traveling. Cloth sleeves can be embellished with embroidery, foil stamping, or embossing, adding a touch of sophistication and individuality to the portable computer mouse storage device 100 aesthetics.

In addition to traditional materials, portable computer mouse storage device's 100 sleeve can incorporate synthetic materials such as vinyl or polyethylene. These materials offer excellent moisture resistance and easy cleaning, making them suitable for protecting portable computer mouse storage device 100 in high-traffic environments or outdoor settings. Furthermore, synthetic sleeves can be customized with printed graphics or transparent windows, allowing for creative branding opportunities. Furthermore, these materials are washable and reusable.

Foldable cover 110 can employ a simple yet effective mechanism to prevent a computer mouse from slipping from portable computer mouse storage device 100. When closed, foldable cover 110 can securely envelop the computer mouse within portable computer mouse storage device 100 and can form a protective barrier around portable computer mouse storage device 100 contents. Foldable cover 110 can involve a flap or tab. Further, foldable cover 110 can tuck into a designated slot or storage pocket 120 to ensure a snug fit or can be secured through a closure mechanism 220. To open foldable cover 110, the user can simply lift foldable cover 110 or pull it away from storage pocket 120, allowing access to portable computer mouse storage device's 100 contents. When closed, foldable cover 110 acts as a shield, preventing the computer mouse from accidentally falling out during transport or storage.

As mentioned, foldable cover 110 can securely envelop the computer mouse storage pocket 120. Storage pocket 120 in portable computer mouse storage device 100 typically functions as a designated compartment for holding the computer mouse. Storage pocket 120 can be located on the interior of portable computer mouse storage device 100, and it can be designed to accommodate other mouse components such as cables and electronic components. Additionally, storage pocket 120 can feature a flap, zipper, or some form of closure to prevent the computer mouse from slipping out unintentionally from storage pocket 120. In addition, it should be understood that portable computer mouse storage device 100 can have multiple storage pockets 120, each serving a specific purpose, such as separating different computer mouses or electronic components. The construction of storage pocket may vary depending on portable computer mouse storage device's 100 design and texture needs.

Wrist support 130 can be within foldable cover 110 and form a cushioning layer. Wrist support 130 in portable computer mouse storage device 100 can enhance user comfort and prevent repetitive strain injuries (RSIs) caused by working in non-ergonomic workstations. Wrist support 130 can have a cushioned surface for the wrist to rest on. The cushion in wrist support 130 can effectively alleviate pressure and reduce discomfort during extended periods of computer use. By having a cushion, wrist support 130 can promote a more natural wrist posture, crucial for minimizing strain and fatigue. Additionally, wrist support 130 can encourage ergonomic positioning of the hand and wrist, which can help prevent conditions like carpal tunnel syndrome by evenly distributing weight and minimizing pressure points. Wrist support 130 can be made of memory foam, soft materials, or gel-like materials, in which wrist support 130 contours to the shape of the wrist, providing personalized comfort and stability to the user.

Figure 2A:
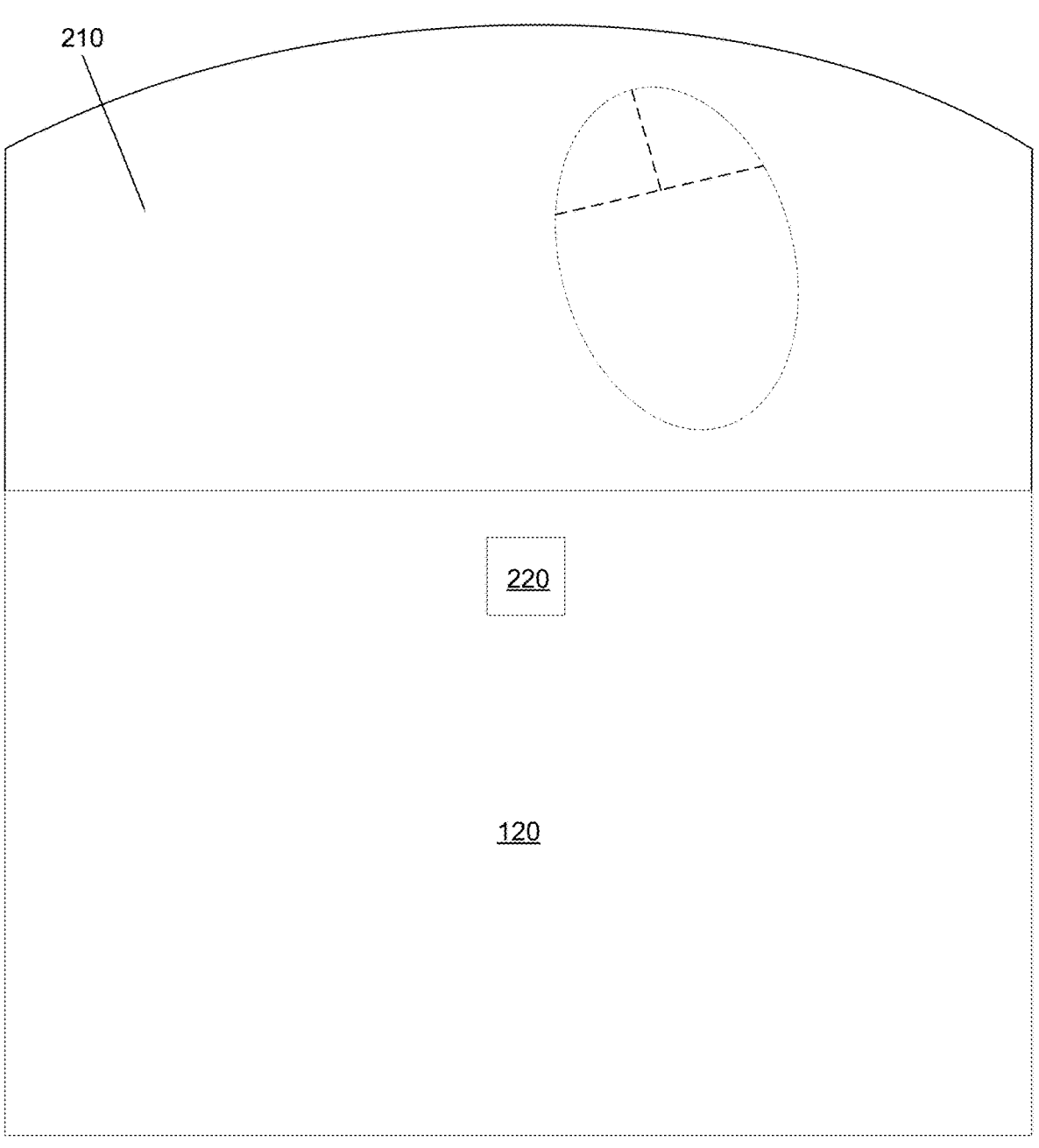
FIGS. 2A and 2B illustrate a portable computer mouse storage device in an open position, according to an embodiment.
Figure 2B:
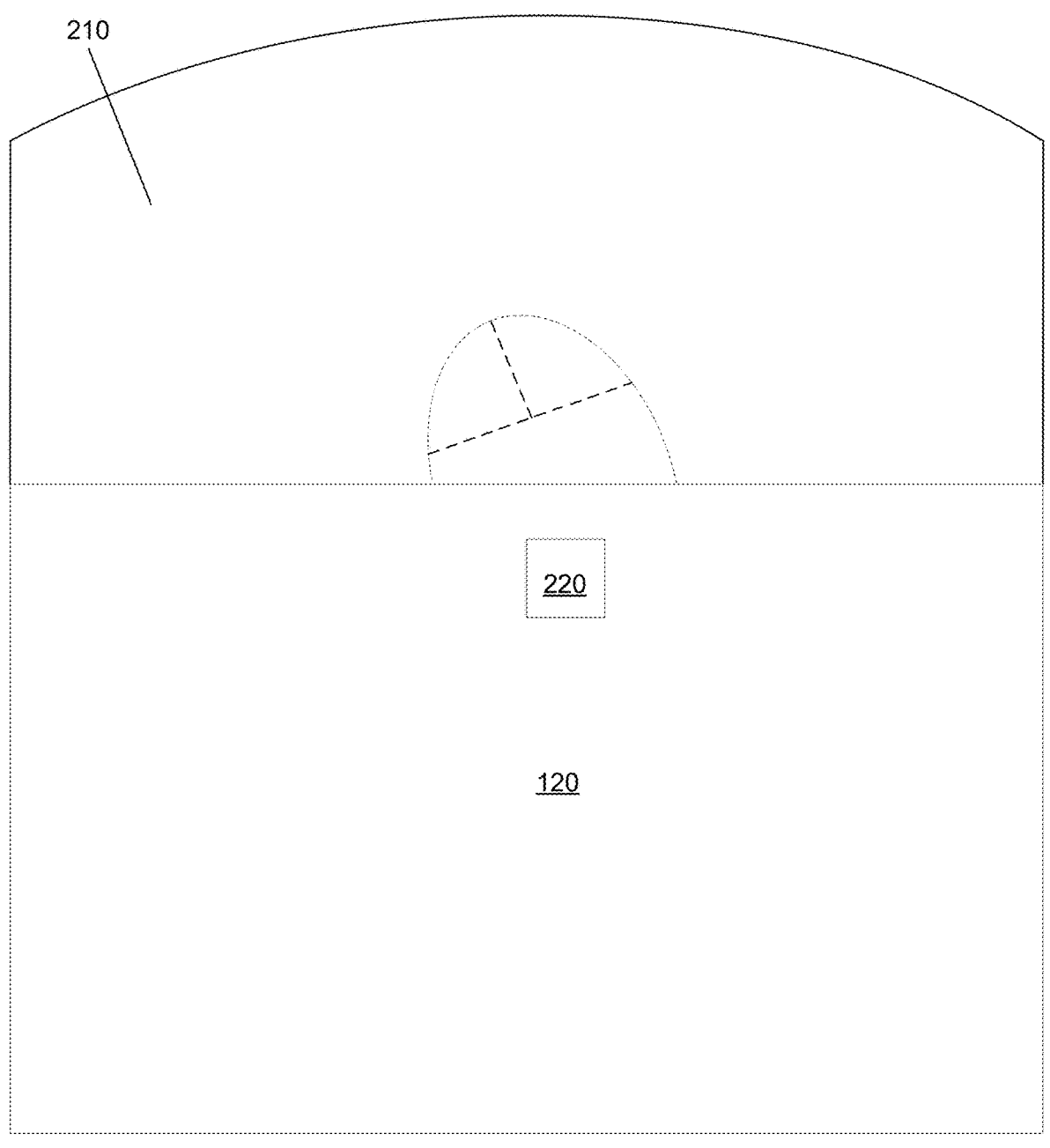

FIGS. 2A and 2B illustrate a portable computer mouse storage device 100 in an open position, according to an embodiment. Further, portable computer mouse storage device 100 includes an internal surface area 210, and a closure mechanism 220. Although only one or two of each component is illustrated, it should be understood portable computer mouse storage device 100 may comprise any number of each component, including a plurality of one or more components.

In essence, internal surface area 210 of portable computer mouse storage device 100 is the internal surface of foldable cover 110 and main body 200, which further runs beneath storage pocket 120. An upper section of the inner surface area 210 can be considered the internal surface of foldable cover. Additionally, a lower section of the inner surface area 210 can be considered main body 200 and a back or inner panel of storage pocket 120. Internal surface area serves as a crucial component in the overall functionality and design of portable computer mouse storage device 100. Internal surface area 210 can be semi-rigid to provide support for foldable cover 110 while securing the computer mouse in storage pocket 120 when portable computer mouse storage device 100 is in closed position. Further, inner surface area 210 can be crafted from a lightweight yet durable lining fabric and still provide structural support while ensuring comfort and ease of movement for the user.

As previously described in FIG. 1, foldable cover 110 can be closed with closure mechanism 220. Closure mechanism 220 can include simple components, such as Velcro® brand hook and loop fasteners or other adhesive components that hold internal surface area 210 attached to storage pocket 120. In simple words, closure mechanism 220 provides a practical solution for securing foldable cover 110 to internal surface area 210 by having closure mechanism 220 in internal surface area 210 and ensure that the computer mouse stays within storage pocket 120 without falling out from portable computer mouse storage device 100. For example, portable computer mouse storage device 100 can feature two Velcro® brand hook and loop fastener strips-one attached to internal surface area 210 of foldable cover 110 and the other to internal surface area 210 of portable computer mouse storage device 100. To close foldable cover 110, the user can simply align one Velcro® brand hook and loop fastener strip in internal surface area 210 opening and press down firmly, allowing the second Velcro® brand hook and loop fastener strips in internal surface area 210 to interlock securely. This creates a tight seal that prevents the computer mouse from slipping out inadvertently from portable computer mouse storage device 100. When access to storage pocket 120 is needed, the user can easily separate the Velcro® brand hook and loop fastener strips by pulling foldable cover 110 away from the body of the wallet. This straightforward closure mechanism combines simplicity with effectiveness, ensuring that the wallet's contents remain safely enclosed during use and transport.

Figure 3:
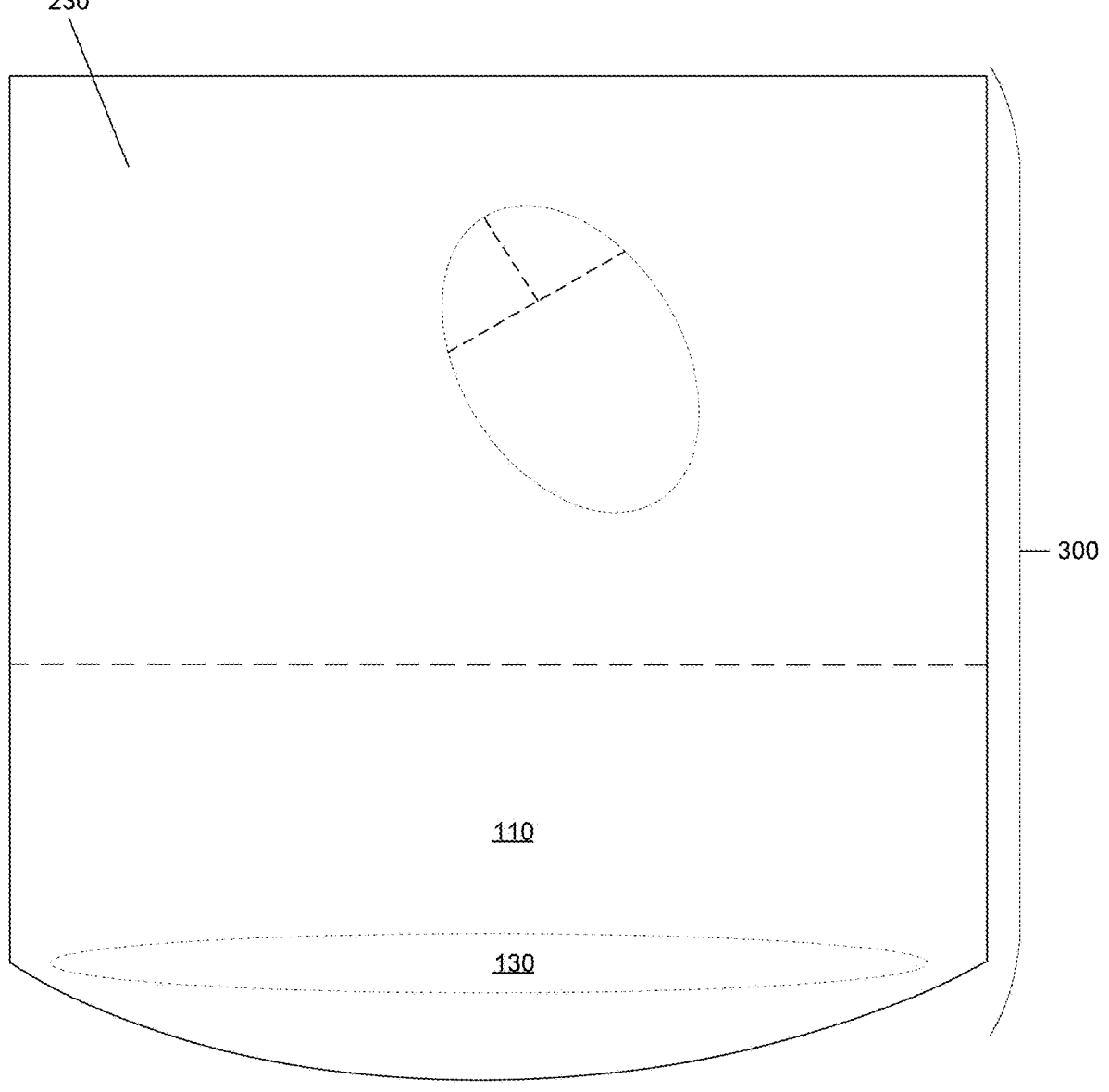
FIG. 3 illustrates a computer mouse pad in a portable computer mouse storage device, according to an embodiment.

FIG. 3 illustrates a computer mouse pad 300 in a portable computer mouse storage device 100, according to an embodiment. By unfolding foldable cover 110 of portable computer mouse storage 100, the user can use the back of foldable cover 110 and an external flat surface area 230 as a computer mouse pad 300. In essence, computer mouse pad 300 is a practical workaround when a traditional mouse pad isn't available. Computer mouse pad 300 comprises foldable cover 110, wrist support 130, and external flat surface mouser pad 300.

Computer mouse pad 300 is a lightweight accessory that can provide a stable surface for the mouse to glide smoothly across when traveling or working in improvised worksta-tions. Further, computer mouse pad 300 can serve as a buffer between the mouse and the desk or table, reducing friction and ensuring precise cursor movements. External flat sur-face area 300 can be made from various materials and covered by a removable sleeve made from traditional cloth to sleek, low-friction plastics, catering to different prefer-ences and usage scenarios.

Further, users can achieve better tracking and maneuver-ability by placing the mouse on computer mouse pad 300. While this solution may not offer the same level of precision and control as a specialized mouse pad in a permanent workstation, it can suffice for temporary use or in situations where improvisation is necessary. Ergonomic considerations can also be taken in consideration for the design of computer mouse pad 300 and wrist support 130, with features like cushioned wrist rests and contoured shapes aimed at pro-moting comfort during extended computer use.

External flat surface 230 material can vary to accommo-date the texture needs of computer mouse pad 300. Further, the removable sleeve can enhance softness of external flat surface 230. For example, materials like microfiber or velvet can be used in the removable sleeve for everyday use and handling. The use of microfibers can ease the washing of the removable sleeve and provide an ultra-soft texture for a better use of the computer mouse in computer mouse pad 300. The size of external flat surface 230 can vary depending on the needs of each user. However, it should be understood that external flat surface 230 is compact and easy to carry while traveling.

Figure 4:
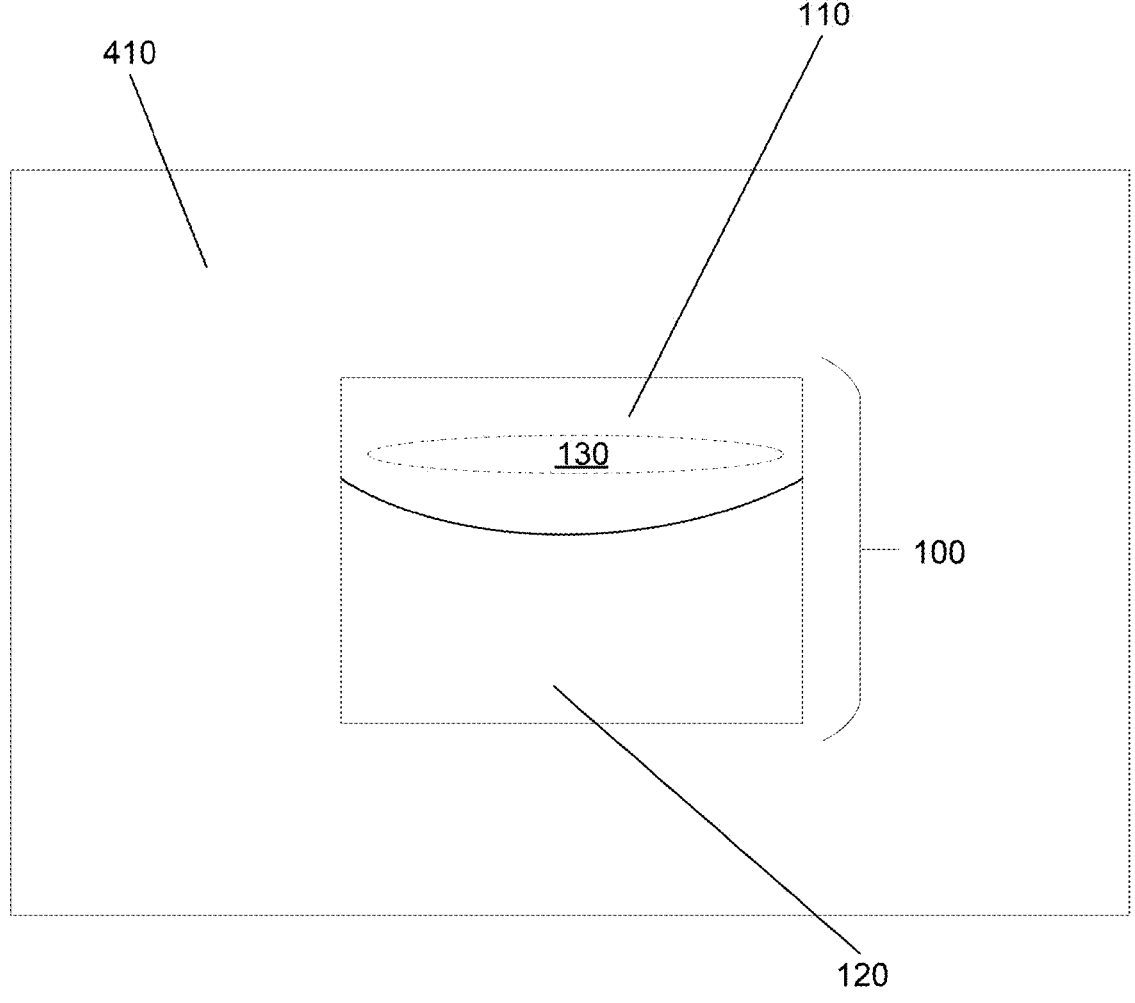
FIG. 4 illustrates a portable computer mouse storage device attached to an electronic device; according to an embodiment.

FIG. 4 illustrates a portable computer mouse storage device 100 attached to an electronic device 410, according to an embodiment. Portable computer mouse storage device 100 can be attached to electronic device 410 for easy transport while traveling. Among several benefits, allowing portable computer mouse storage device 100 to be attached to electronic device 410 can allow easy access and transport of portable computer mouse storage device 100. Further, the attachment enhances convenience by having portable com-puter mouse storage device 100 ready for use at any time. This ensures that users have everything they need in one place, reducing the risk of forgetting or misplacing acces-sories.

Figure 5:
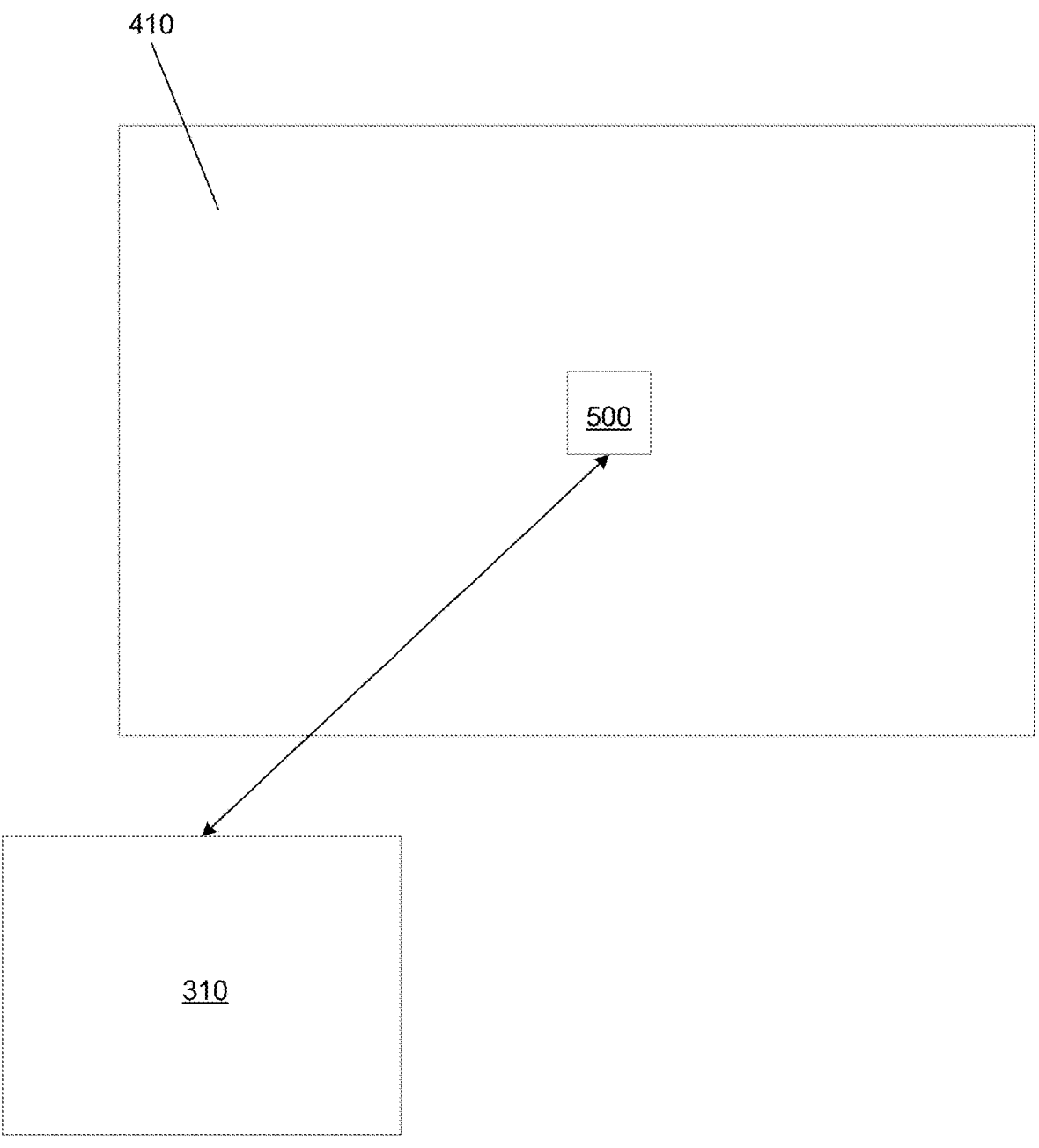
FIG. 5 illustrates an attaching mechanism of a portable computer mouse storage device; according to an embodiment.

FIG. 5 illustrates an attaching mechanism 500 of a por-table computer mouse storage device 100, according to an embodiment. As shown in FIG. 5, portable computer mouse storage 100 attaches to electronic device 410 via attachment mechanism 500. Attachment mechanism 500 can be a ver-satile and convenient solution for keeping portable computer mouse storage 100 and electronic device 410 together. For example, attachment mechanism 500 can be Velcro® brand hook and loop fasteners, with its hook-and-loop design, which provides a secure yet removable connection between portable computer mouse storage device 100 and electronic device 410. Attachment 500 allows for easy repositioning or removal of portable computer mouse storage device 100. Alternatively, attachment 500 can consist of adhesive options like double-sided tape or adhesive pads to provide a more permanent attachment.

Figure 6:
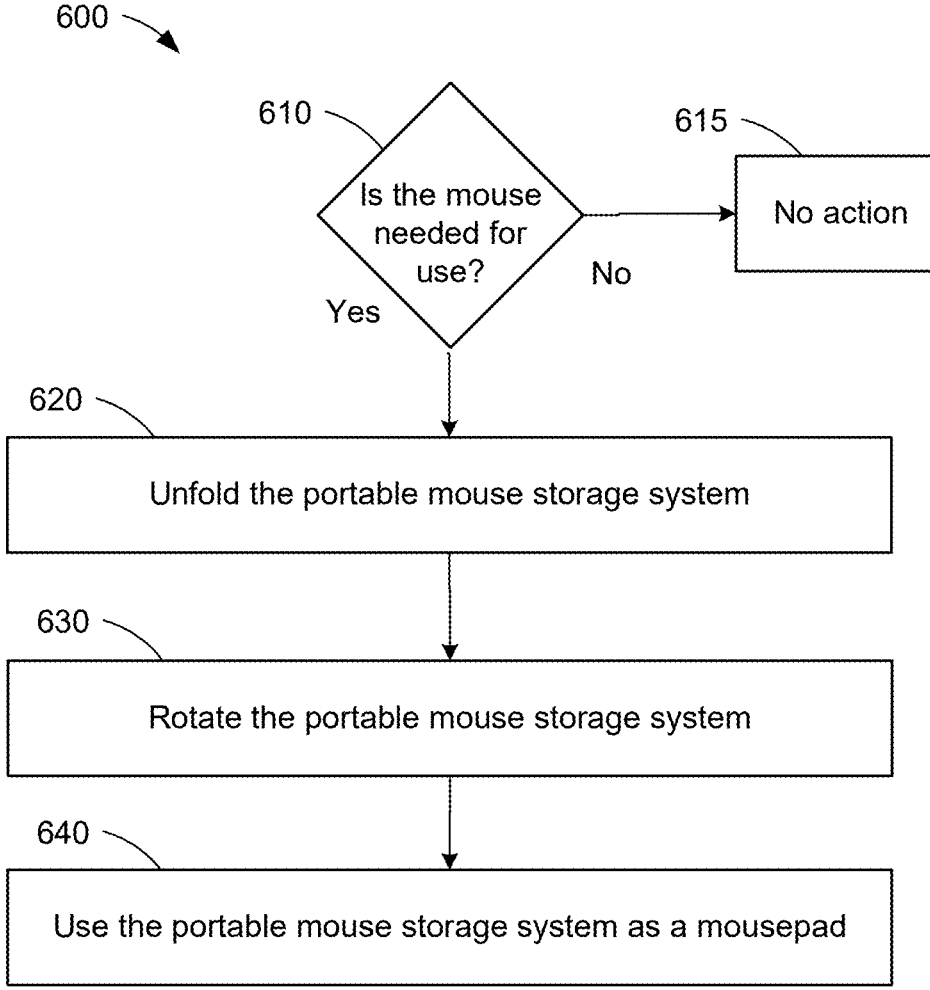
FIG. 6 illustrates a computer mouse storing process; according to an embodiment.

FIG. 6 illustrates a computer mouse storing process 600, according to an embodiment.

First, step 610 illustrates whether the user needs to use the computer mouse or not. If the user does not require the use of the computer mouse, then there is no action as shown in step 615. If the user requires the use of the computer mouse, then the user unfolds portable computer mouse storage device 100, as shown in step 620. After, the user can rotate portable mouse storage device 100 in step 630. Finally, in step 640, user can use portable mouse storage device 100 computer mouse pad 300.

INDUSTRIAL APPLICABILITY

Typically, people in fast-paced environments are con-stantly working in non-suitable places, making them adapt to non-ergonomic workspaces, especially professionals who have to work without a mouse pad or a proper desk. On the other hand, when a mouse pad is available, it is often bulky and inconvenient for those who travel frequently for busi-ness. However, not carrying bulky accessories means that many opt to use the bare surfaces available to them, per-petuating the ergonomic risks.

Accordingly, a portable computer mouse storage device 100, which is capable is being lightweight and compact, can offer a variety of benefits. Portable computer mouse storage device 100 includes a main body 200 (shown in FIG. 2), a foldable cover 110 with a wrist support 130, and which can be opened and closed, and a closure mechanism 220. Fur-ther, main body 200 comprises a storage pocket 120, an internal surface area 210, and an external flat surface area 230. Portable computer mouse storage device 100 can offer several industrial benefits, primarily by enhancing the per-formance and longevity of a computer mouse. Additionally, portable computer mouse storage device 100 can facilitate precise cursor movement, contributing to increased produc-tivity and accuracy in tasks requiring precise mouse control, such as graphic design, gaming, and data entry. From an ergonomic perspective, portable computer mouse storage device 100 can enhance wrist comfort and prevent repetitive strain injuries. Wrist support 130 of portable computer mouse storage device 100 can reduce the friction between the computer mouse and the temporary workstation, allow-ing for smoother gliding movements and reducing the strain on the wrist during prolonged electronic device 410 use. Additionally, portable computer mouse storage device 100 can feature ergonomic designs that provide extra support, further enhancing comfort and reducing the risk of discom-fort or injury associated with extended computer mouse usage.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of industrial context or with a particular type of irrigation distribution system 140. Hence, although the present embodiments are, for convenience of explanation, depicted and described as being implemented with irrigation systems, it will be appreciated that it can be implemented for various other types of liquid distribution systems, and in various other environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A portable computer mouse storage device, comprising:
a main body portion formed of flexible material configured to accommodate a portable computer mouse, the main body portion having
an external flat surface area configured to accommodate movement of the portable computer mouse,
an internal surface area in the opposite side of the external flat surface area, and
a storage pocket in the opposite side of the external flat surface area,
wherein the internal surface area runs beneath the storage pocket;
a foldable cover attached to the main body portion, configured to be folded towards the internal surface area of the main body portion;
wherein the foldable cover includes a cushioning layer positioned within the foldable cover; and
a closure mechanism configured to secure the foldable cover to the storage pocket.

2. The portable computer mouse storage device of claim 1, wherein the foldable cover can be unfolded to become a computer mouse pad.

3. The portable computer mouse storage device of claim 2, wherein the foldable cover is configured to provide wrist support.

4. The portable computer mouse storage device of claim 1, wherein the main body portion further comprises an attaching mechanism configured to attach to an electronic device.

5. The portable computer mouse storage device of claim 4, wherein the attaching mechanism is located within the external flat surface area.

6. The portable computer mouse storage device of claim 4, wherein the attaching mechanism is a hook and loop patch.

7. The portable computer mouse storage device of claim 1, wherein the flexible material possesses a degree of flexibility while still maintaining rigidity to support the portable computer mouse movement.

8. The portable computer mouse storage device of claim 1, wherein the cushioning layer comprises a gel-filled or memory foam material to provide ergonomic support during the portable computer mouse usage.

9. The portable computer mouse storage device of claim 1, wherein the closure mechanism is capable of opening and closing the storage pocket to enable insertion and removal of the portable computer mouse.

10. A computer mouse pad with a storage system, the system comprising:
a main body portion formed of flexible material configured to accommodate a portable computer mouse, the main body portion having
an external flat surface area configured to accommodate movement of the portable computer mouse,
an internal surface area in the opposite side of the external flat surface area, and
a storage pocket in the opposite side of the external flat surface area and,
wherein the internal surface area runs beneath the storage pocket;
a foldable cover attached to the main body portion, configured to be folded towards the internal surface area of the main body portion;
wherein the foldable cover includes a cushioning layer positioned within the foldable cover; and
a closure mechanism configured to secure the foldable cover to the storage pocket.

11. The computer mouse pad with a storage system of claim 10, wherein the foldable cover can be unfolded to become a computer mouse pad.

12. The computer mouse pad with a storage system of claim 11, wherein the foldable cover is configured to provide wrist support.

13. The computer mouse pad with a storage system of claim 10, wherein the main body portion further comprises an attaching mechanism configured to attach to an electronic device.

14. The computer mouse pad with a storage system of claim 13, wherein the attaching mechanism is located within the external flat surface area.

15. The computer mouse pad with a storage system of claim 10, wherein the flexible material possesses a degree of flexibility while still maintaining rigidity to support the portable computer mouse movement.

16. The computer mouse pad with a storage system of claim 10, wherein the cushioning layer comprises a gel-filled or memory foam material to provide ergonomic support during the portable computer mouse device usage.

17. The computer mouse pad with a storage system of claim 10, wherein the closure mechanism is capable of opening and closing the storage pocket to enable insertion and removal of the portable computer mouse.

18. A method for storing a portable computer mouse, comprising:
forming a main body portion using flexible material to accommodate a portable computer mouse, wherein the main body portion includes
an external flat surface area configured to accommodate movement of the portable computer mouse,
an internal surface area in the opposite side of the external flat surface area, and
a storage pocket in the opposite side of the external flat surface area,
wherein the internal surface area runs beneath the storage pocket;
attaching a foldable cover to the main body portion, the foldable cover being foldable towards the internal surface area of the main body portion;
wherein the foldable cover includes a cushioning layer positioned within the foldable cover; and wherein the foldable cover can be unfolded to become a computer mouse pad.

* * * * *